US011635372B2

(12) United States Patent
Senez et al.

(10) Patent No.: US 11,635,372 B2
(45) Date of Patent: Apr. 25, 2023

(54) OPTICAL DETECTION METHOD

(71) Applicants: Universite De Lille, Lille (FR); Centre National De La Recherche Scientifique, Paris (FR); Institut National De La Recherche Agronomique, Paris (FR); Institut National Des Sciences Appliquees De Toulouse, Toulouse (FR)

(72) Inventors: Vincent Senez, Baisieux (FR); Alexis Vlandas, Villeneuve d'Ascq (FR); Sebastien Lamant, Lille (FR); Bernard Cathala, La Chapell-sur-Erdre (FR); Celine Moreau, Nantes (FR); Gabrielle Veronese, Lautignac (FR); Sophie Bozonnet, Toulouse (FR); Elisabeth Laville, Toulouse (FR); Megane Cleret, Toulouse (FR)

(73) Assignees: Universite De Lille, Lille (FR); Centre National De La Recherche Scientifique, Paris (FR); Institut National De La Recherche Agronomique, Paris (FR); Institute National Des Sciences Appliquees De Toulouse, Toulouse (FR)

( * ) Notice: Subject to any disclaimer, the term of this patent is extended or adjusted under 35 U.S.C. 154(b) by 624 days.

(21) Appl. No.: 16/618,605

(22) PCT Filed: Jun. 1, 2018

(86) PCT No.: PCT/EP2018/064496
§ 371 (c)(1),
(2) Date: Dec. 2, 2019

(87) PCT Pub. No.: WO2018/220189
PCT Pub. Date: Dec. 6, 2018

(65) Prior Publication Data
US 2020/0182787 A1 Jun. 11, 2020

(30) Foreign Application Priority Data
Jun. 2, 2017 (FR) .................... 1754926

(51) Int. Cl.
*G01N 21/45* (2006.01)
*G01N 21/77* (2006.01)
*G01N 21/17* (2006.01)

(52) U.S. Cl.
CPC ............. *G01N 21/45* (2013.01); *G01N 21/17* (2013.01); *G01N 21/77* (2013.01); *G01N 21/453* (2013.01); *G01N 2021/451* (2013.01)

(58) Field of Classification Search
CPC .......... C12Q 1/34; G01N 21/45; G01N 21/41; G01N 21/4788; G01N 21/55; G01N 21/77;
(Continued)

(56) References Cited

U.S. PATENT DOCUMENTS 5,468,606 A * 11/1995 Bogart .................. B82Y 15/00
436/805
2003/0190612 A1 10/2003 Yamamoto et al.
(Continued)

FOREIGN PATENT DOCUMENTS

FR 2962545 A1 1/2012
JP 2002-065274 A 3/2002
(Continued)

OTHER PUBLICATIONS

Japanese Office Action ("JP OA") for JP App. No. 2020-516958 dated Apr. 25, 2022 (3 pages).
(Continued)

*Primary Examiner* — Michael P Stafira
(74) *Attorney, Agent, or Firm* — Shumaker, Loop & Kendrick, LLP

(57) ABSTRACT

A process for detecting the sensitivity of one or more polymers and/or of one or more mixtures of polymers to a
(Continued)

compound, including the steps of exposing a plurality of individualized micro-deposits including the polymer(s) and/or the mixture(s) of polymers to the compound, and detecting, by interferometry, a variation in appearance of an assembly of micro-deposits exposed to the compound and/or a variation in the dimensions and/or refractive index of at least one of the micro-deposits exposed to the compound, linked to an interaction between the polymer(s) and/or the mixture(s) of polymers and the compound.

30 Claims, 3 Drawing Sheets

(58) Field of Classification Search
CPC ........... G01N 2021/7779; G01N 21/78; G01N 2021/451; G01N 21/17; G01N 21/453; G01N 21/85; G01N 21/35; G01N 21/3563; G01N 21/8806; G01N 21/95; G01N 21/7703; G01N 2201/08; G01N 33/54373; G01N 21/23; G01N 21/3103; G01N 21/4133; G01N 21/648; G01N 2021/058; G01N 21/01; G01N 21/03; G01N 21/0303; G01N 21/25; G01N 21/31; G01N 21/7743; G01N 25/00; G01N 2021/7776; G01N 2021/7786; G01N 21/253; G01N 21/59; G01N 21/6454; G01N 27/02; G01N 33/4836; G01N 33/543; G01N 1/36; G01N 2033/0095; G01N 21/47; G01N 21/552; G01N 21/8803; G01N 21/8851; G01N 27/447; G01N 27/44726; G01N 27/44791; G01N 33/557; G01N 2015/1006; G01N 2021/0346; G01N 2021/115; G01N 2021/1721; G01N 2021/1727; G01N 2021/479; G01N 2021/6463; G01N 2021/7723; G01N 2035/00039; G01N 21/11; G01N 21/1717; G01N 21/4795; G01N 21/553; G01N 21/6486; G01N 21/8422; G01N 2201/0221; G01N 2201/0691; G01N 2201/0873; G01N 2333/4712; G01N 33/02; G01N 33/48; G01N 33/493; G01N 33/54353; G01N 33/68; G01N 5/04
See application file for complete search history.

(56) References Cited

U.S. PATENT DOCUMENTS

| | | | |
|---|---|---|---|
| 2006/0134601 A1* | 6/2006 | Torres | G01N 13/04 435/4 |
| 2006/0226008 A1 | 10/2006 | Rodgers et al. | |
| 2013/0115643 A1 | 5/2013 | Cathala | |
| 2017/0038380 A1 | 2/2017 | Tao et al. | |

FOREIGN PATENT DOCUMENTS

| | | | | |
|---|---|---|---|---|
| JP | 2002-509274 A | | 3/2002 | |
| JP | 2002-122601 A | | 4/2002 | |
| JP | 2003-528311 A | | 9/2003 | |
| JP | 2010-509593 A | | 3/2010 | |
| JP | 2010265450 A | | 11/2010 | |
| KR | 20090024965 A | * | 3/2009 | |
| WO | 94/03774 A1 | | 2/1994 | |
| WO | 99/36760 A1 | | 7/1999 | |
| WO | 01/71322 A2 | | 9/2001 | |
| WO | 2003062334 A1 | | 7/2003 | |
| WO | 2008/127402 A2 | | 10/2008 | |
| WO | 2012004536 A1 | | 1/2012 | |
| WO | WO-2012004536 A1 | * | 1/2012 | ............... C12Q 1/34 |
| WO | WO-2017066213 A1 | * | 4/2017 | ............. E21B 49/08 |

OTHER PUBLICATIONS

Corinna Schuler et al. "Decomposable Hollow Biopolymer-Based Capsules", Biomacromolecules, vol. 2, No. 3, p. 921-926, (Nov. 3, 2001).

Hong Wu et al. "Molecularly imprinted organic-inorganic hybrid membranes for selective separation of phenylalanine isomers and its analogue", Separation and Purification Technology, vol. 68, p. 97-104 (2009).

Vincent Ducere et al. "A capacitive humidity sensor using crosslinked cellulose acetate butyrate", Sensors and Actuators B, vol. 106, p. 331-334 (2005).

Huiyan Li et al. "Hydrogel droplet microasays with trapped antibody-functionalized beads for multiplexed protein analysis", Lab Chip, vol. 11, p. 528-534 (2011).

Shouichi Sakakihara et al. "A single-molecule enzymatic assay in a directly accessible femtoliter droplet array", Lab Chip, vol. 10, p. 3355-3362 (2010).

Jens Voskuhl et al. "Advances in contact printing technologies of carbohydrate, peptide, and protein arrays", Current Opinion in Chemical Biology, vol. 18, p. 1-7 (2014).

Nobutoshi Komuro et al. "Inkjet printed (bio)chemical sensing devices", Anal Bioanal Chem, vol. 405, p. 5785-5805 (2013).

Archana N. Rao et al. "Biophysical properties of nucleic acids at surfaces relevant to microarray performance", Biomater. Sci., vol. 2, p. 436-471 (2014).

Christiane L. Salgado et al., "Combinatorial ceil-3D biomaterials cytocompatibility screening for tissue engineering using bioinspired superhydrophobic substrates", Integr. Biol., vol. 4, p. 318-327 (2012).

International Search Report for PCT/EP2018/064496 dated Jun. 29, 2018 (7 pages).

Preetam Anbukarasu et al. "A diffraction-based degradation sensor for polymer thin films", Polymer Degradation and Stability, vol. 142, pl. 102-110, (2017).

English translation of Japanese Office Action for JP Pat. App. No. 2019-566573 dated Mar. 10, 2022 (15 pages).

U.S. Office Action (US OA) for U.S. Appl. No. 16/618,639 dated Nov. 17, 2022 (14 pages).

Restriction Requirement issued in U.S. Appl. No. 16/618,639 dated Jun. 28, 2022 (7pages).

* cited by examiner

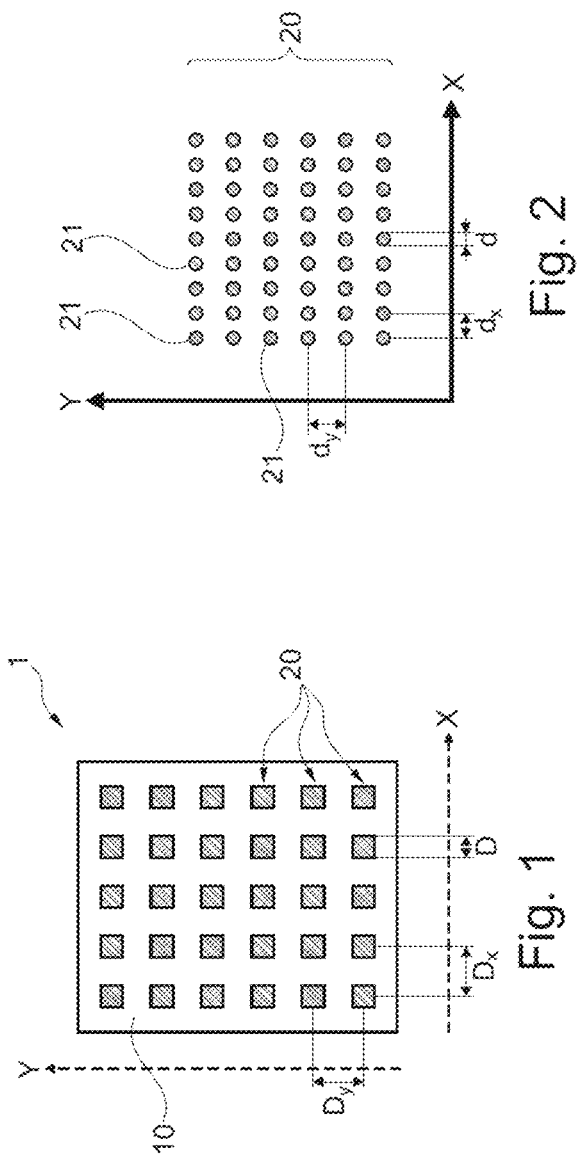

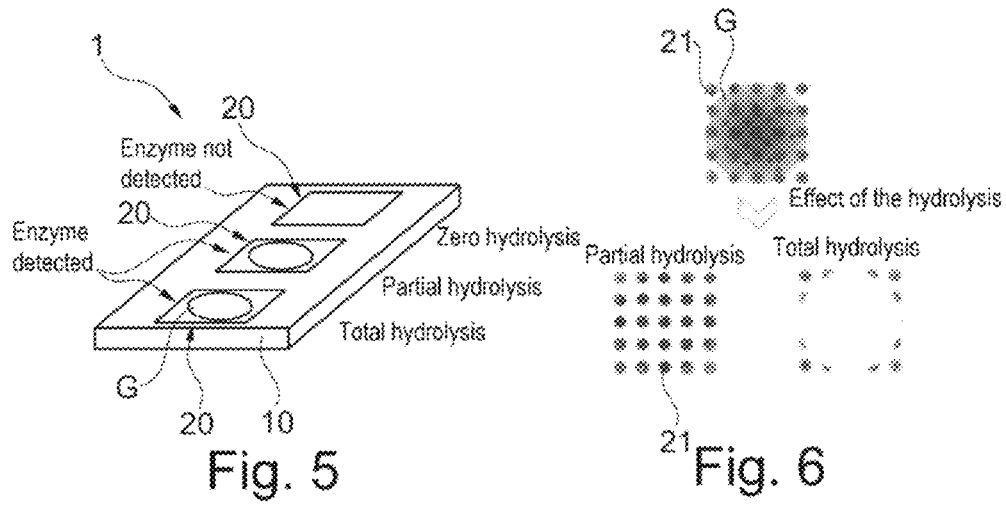
Fig. 5
Fig. 6
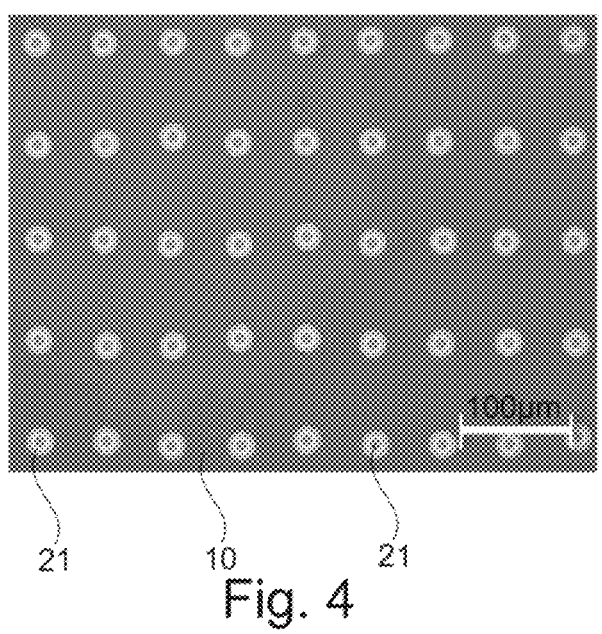
Fig. 4
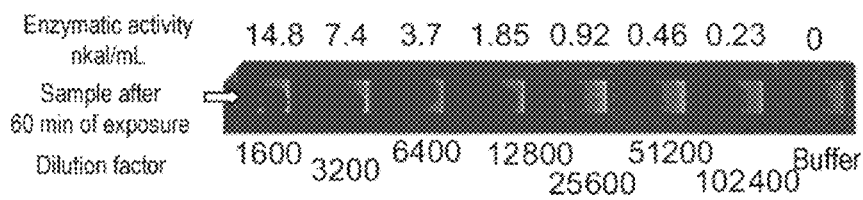
Fig. 7

OPTICAL DETECTION METHOD

TECHNICAL FIELD AND BACKGROUND

The present invention relates to the detection of the sensitivity of one or more polymers to a compound, in particular that of one or more biopolymers to an enzyme.

In the rest of the document, according to the invention the term "polymer" refers to a natural or synthetic homopolymeric or heteropolymeric polymer, the structure of which may be crystalline, amorphous or hybrid (amorphous and crystalline), or a mixture of "polymers" defined as above.

The polymer according to the invention (single or in a mixture) may be supplemented with a chemical agent creating covalent bonds between the chains of the polymer (or of the polymer mixture). This chemical agent may be a thermosetting resin, depending on the chains to be bonded. The term "resin" refers to a chemical substance which has the capacity of forming covalent bonds with the "polymer" via an energy input of thermal, photonic or chemical type.

The term "compound" refers to a chemical or biological agent which has the capacity of chemically or physically modifying the refractive index and/or the geometry of the "polymer" deposit. In many technical and industrial fields, the identification and study of enzymes with degrading activity on natural or synthetic polymers is a major challenge.

For example, certain degradation enzymes, for example hydrolytic enzymes, are an essential tool for generating biofuels from lignocellulose-rich biomass.

More precisely, plant walls are complex structures formed from entangled polymers (cellulose, hemicelluloses, lignins, pectins, etc.); degradation enzymes are used, for example, to break cellulose and hemicellulose chains into sugars intended to be fermented in order to create bioethanol, among other applications.

To this end, it is advantageous to use technical devices which allow the rapid, simple and reliable detection of the degradation activity of an enzyme, or of a combination of enzymes, toward a polymer or a combination of polymers.

It is in particular common practice to use dedicated colorimetric devices, which use chemical reactions to reveal the enzymatic activity. These colorimetric devices use for this purpose chemical detection dyes or indicators.

The majority of the existing enzymatic tests make it possible to study an enzyme or a type of microorganism which expresses an enzyme in the multiwell plate format, to the wells of which is added a substrate (for example a polymer), which, under the action of the enzyme, is converted into a fluorescent or colored product. This format requires the production of modified substrates (addition of a fluorescent molecule or of a colored chemical compound). It is also possible to reveal the presence of a reaction product by adding a chromogenic reagent. In these two cases, the volumes of material are at the minimum a few microliters. It requires advanced and expensive automated tools, and extremely sensitive photon sensors.

Colorimetric devices for detecting hydrolytic activity toward one or more polymers are thus often complex to use and require many manipulations and reagents. When no chromogenic substrate or reagent is used, it is necessary to employ analytical tools such as mass spectrometry, chromatography, infrared spectrometry or nuclear magnetic resonance. Despite the numerous advantages of these tools (sensitivity, specificity of detection of the catalytic act), they require expensive equipment and particular expertise for their use.

Other devices use interferometry to detect the degradation activity of a polymer.

These devices include for this purpose at least one transparent thin film of polymer applied on a reflective support (conventionally silicon). The thickness of this transparent film is within a range of values allowing the appearance of a particular color due to an optical interference phenomenon, resulting from the fact that a portion of the incident beam is reflected at the air/film interface, whereas another portion of the incident beam is refracted and then reflected at the film/support interface. The interference of the reflected beams and of the refracted beams creates an interference pattern. The resulting color corresponds to the wavelength at which the constructive interference is maximal.

A device of this type is described in patent application FR 2 962 545, being intended in particular for detecting the hydrolytic activity toward a polymer, typically a polysaccharide, mainly constituting the material of the thin transparent film deposited on the reflective support.

The studies conducted have shown that, for an incubation time of a few tens of minutes, this method has a sensitivity threshold that is from 125 to 1000 times lower than the methods conventionally used in enzyme identification.

This method however has certain limitations.

Specifically, it causes substantial loss of material during the manufacture of the thin film since a large portion of the surface of the support must be coated with polymer, and continuously coated, to allow light interferences to be manifested. By using the centrifugal coating technology, the loss of material is considerable (more than 90%), which is a major drawback in terms of industrialization, or when the polymer to be tested is only available in very small amount.

The spreading of a single polymer or of a single mixture of polymers per support also represents a limit of this method.

SUMMARY

There is thus a need for a new process for detecting enzymatic activity which overcomes all or some of the above drawbacks, and in particular which does not require a large amount of polymer.

The invention is also directed toward providing, if so desired, an associated process for precisely and quantitatively measuring the hydrolysis of a polymer by an enzyme, for example by monitoring the hydrolysis kinetics.

BRIEF DESCRIPTION OF THE FIGURES

The invention may be understood more clearly on reading the detailed description that follows, of nonlimiting examples of implementation thereof, and also on examining the attached drawing, in which:

FIG. 1 represents in to view an examine of a device according to the invention,

FIG. 2 represents schematically in enlarged scale a macropattern,

FIG. 3 represents a detail of the formation of the microdeposits,

FIG. 4 illustrates the formation of interference fringes on the micro-deposits,

FIG. 5 illustrates the use of the device for detecting a hydrolysis reaction,

FIG. 6 illustrates the effect of the compound on the micro-deposits.

FIG. 7 illustrates enzymatic activity tests performed using devices according to the invention, FIG. 8 also illustrates enzymatic activity tests performed using devices according to the invention.

DETAILED DESCRIPTION

Detection Process

Figure 8:
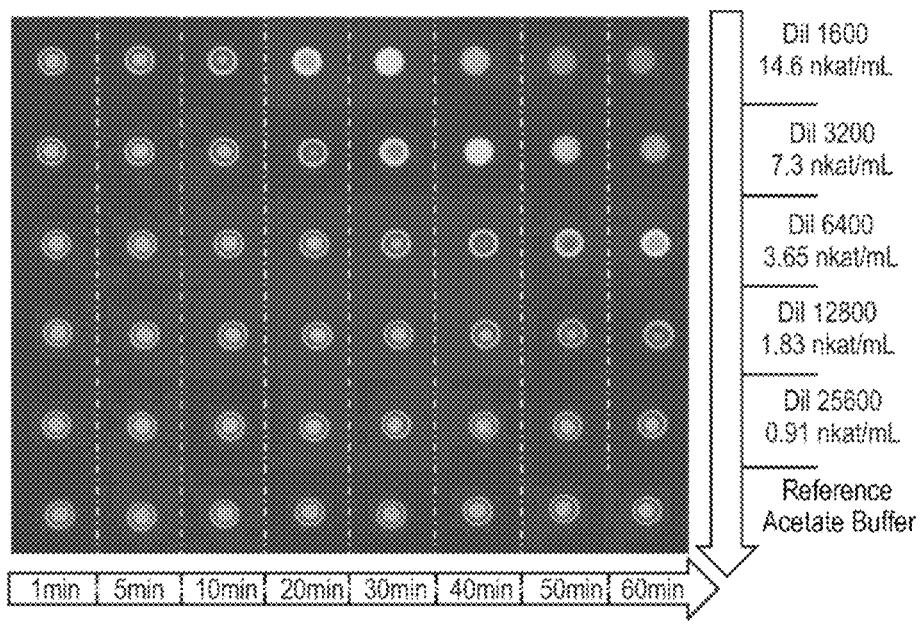
Figure 9:
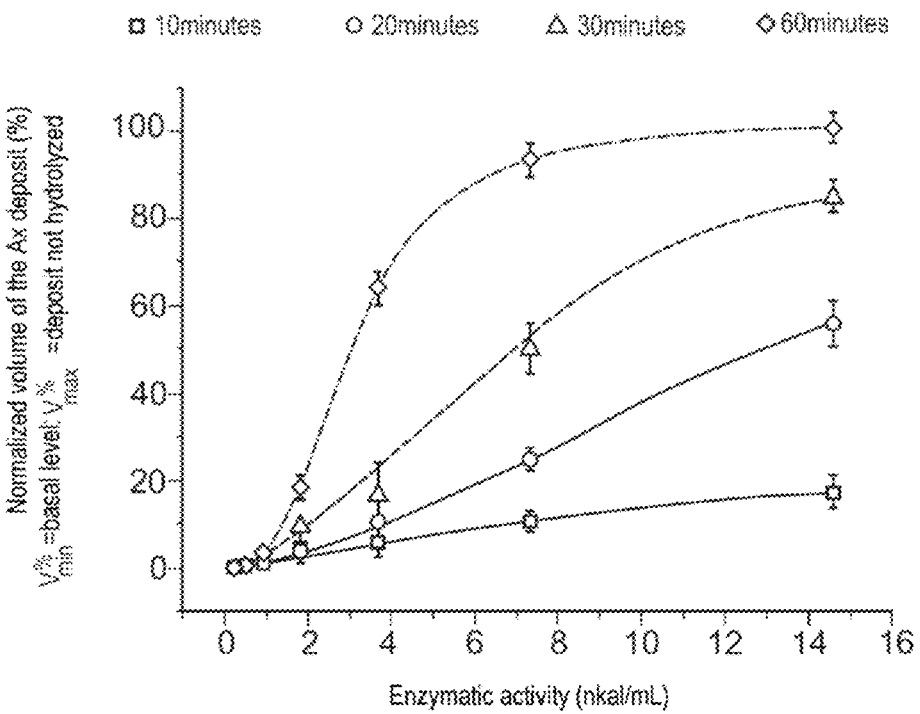
FIG. 9 is a comparison of the enzymatic activity at various incubation durations, obtained using a device according to the invention.

According to a first subject, the present invention relates to a process for detecting the sensitivity of a polymer or of a mixture of polymers to a compound, for example one or more enzymes, including the steps consisting in:
- exposing a plurality of individualized micro-deposits including the polymer or the mixture of polymers to the compound, and
- detecting a variation in appearance of an assembly of micro-deposits exposed to the compound and/or a variation in the dimensions and/or refractive index of at least one of the micro-deposits exposed to the compound, linked to an interaction between the polymer or the mixture of polymers and the compound.

The present invention also relates to a process for detecting the sensitivity of one or more polymers and/or of one or more mixtures of polymers to a compound, including the steps consisting in:
- exposing a plurality of individualized micro-deposits including the polymer(s) and/or the mixture(s) of polymers to the compound, and
- detecting, by interferometry, a variation in appearance of an assembly of micro-deposits exposed to the compound and/or a variation in the dimensions and/or refractive index of at least one of the micro-deposits exposed to the compound, linked to an interaction between the polymer(s) and/or the mixture(s) of polymers and the compound.

The surface of the micro-deposit(s) can be illuminated with a suitable light, preferably monochromatic light.

The micro-deposits according to the invention may be monolayers, i.e. including a single layer, and/or may be multilayers, i.e. including several superposed layers.

Each layer may include the polymer or the mixture of polymers.

In the case where the micro-deposit is a monolayer, this monolayer may be in the form of a single block including the polymer or the mixture of polymers. The monolayer is placed on a support, preferably in contact with said support. Preferably, this monolayer is lens-shaped.

In the case where the micro-deposit is a multilayer, this multilayer may have two layers, notably with a core-shell architecture. The micro-deposit may then have a first layer corresponding to a core, and a second layer corresponding to a shell.

The first layer may be placed on the support, preferably in contact therewith, and may be lens-shaped.

The second layer may at least partially and preferably totally cover the first layer and may have a form complementary to that of the first layer.

The first and second layers may each have a face facing the support, referred to as the inner face, and a face opposite the face that is facing the support, known as the outer face.

Preferably, the inner face of the first layer is in contact with the support.

Preferably, the outer face of the first layer is convex and is in contact with the inner face of the second layer.

The micro-deposit including two layers with a core-shell architecture may have a core comprising, for example, only one first polymer and a shell comprising, for example, only one second polymer different from the first one, or a core comprising several polymers and a shell comprising several polymers, or a core comprising only one polymer and a shell comprising several polymers, or alternatively a core comprising several polymers and a shell comprising only one polymer.

The type of micro-deposit chosen is suited to the intended application.

Preferably, the thickness of the micro-deposits is chosen to allow the formation of an interference pattern when the micro-deposits are illuminated with a suitable light.

The above interaction may be accompanied by the appearance of a contrast, which is visible to the naked eye, of an assembly of micro-deposits relative to the neighboring micro-deposits not exposed to the compound, and also by a variation in the interference pattern for each micro-deposit, which is observable with a small magnification, for example greater than or equal to ×5, for example ×20.

The appearance of this contrast constitutes a quick and easy means for demonstrating the sensitivity of the polymer(s), preferably of the polymer, with regard to the compound.

The variation of the interference pattern offers a finer means for measuring the interaction.

The step of exposing the micro-deposits to the compound may comprise a period of incubation at room temperature, which may last, for example, from 1 to 240 minutes. This step may be followed by a washing step and a drying step.

When the interaction between the polymer(s) and the compound brings about degradation of the polymer(s) by the compound, the micro-deposit containing the polymer(s) will decrease in volume. If the polymer(s) are not sensitive to the compound with which they are placed in contact, the micro-deposit containing the polymer(s) will substantially maintain its volume and its shape.

Preferably, when the interaction between the polymer and the compound brings about degradation of the polymer by the compound, the micro-deposit containing the polymer will decrease in volume. If the polymer is not sensitive to the compound with which it is placed in contact, the micro-deposit containing the polymer will substantially maintain its volume and its shape.

Detection of a variation in the volume of at least one micro-deposit may be performed by interferometry, inter alia, by observation of the variation of an observed interference pattern, this volume variation taking place under the effect of an interaction between the polymer(s) and/or the mixture(s) of polymers, preferably between the polymer or the mixture of polymers, and the compound. Preferably, this detection is performed after magnification of the interference pattern t.

Detection by interferometry is advantageously accompanied by the reconstruction of the volume of the micro-deposit from the localization of the interference fringes.

Detection by interferometry thus allows a more quantitative approach to the sensitivity of the polymer with respect to the compound.

The thickness of the micro-deposits is preferably between 100 nm and 1500 nm, better still between 100 and 1000 nm, the thickness of each micro-deposit advantageously passing through only one maximum.

Thus, according to one embodiment, each micro-deposit has a convex outer surface.

The largest dimension of the micro-deposits is preferably between 10 μm and 100 μm.

Preferably, the micro-deposits have a substantially circular contour.

The micrometric-scale micro-deposits are preferably deposited so as to form macro-patterns that are discernible from each other by the naked eye, of millimetric scale. These macro-patterns are preferably separated and detached from each other.

The macro-patterns may be arranged like the wells of a multi-well grid for automated deposition, for example a 96-well grid.

This can facilitate the use of automatic tools for depositing one or more test compounds onto the macro-patterns and then the analysis of any variations in appearance on each macro-pattern analogously to the observation of a reaction in each well.

According to a preferred embodiment, the micro-deposits are arranged in the form of raster dots (classic or stochastic), the spacing between the raster dots preferably being small enough for the coating formed by the micro-deposits to appear, in a macro-pattern, which is continuous to the naked eye at a distance of 25 cm (punctum proximum). The raster may be regular, as may be the size of the micro-deposits. In other words, each micro-deposit may not be discernible to the naked eye, whereas the macro-patterns are.

Many techniques exist for producing such an arrangement of micro-deposits: photolithography (Rao, et al., 2014), microcontact (Voskuhl, et al., 2014) and inkjet printing (Komuro, et al., 2013). The arrangement, which may be periodic, may in particular be in the form of a network or of a matrix of micro-deposits.

According to a preferred embodiment, the micro-deposits are obtained by inkjet printing.

The advantages of inkjet printing are (i) the low value of the volumes ejected (of the order of a picoliter, modulable according to the properties of the liquid or the ejection parameters, allowing a high density of micro-deposits), (ii) the absence of contact with the solid support (eliminates any damage of the support and/or of the printing head), (iii) the existence of an ink reservoir external to the printing head, which makes it possible to produce several thousand macro-patterns of micro-deposits before depletion of the ink, which greatly improves the reproducibility of the deposits, and (iv) a high printing rate, for example up to 500 droplets per second.

The support on which the micro-deposits are located may be solid or flexible, and flat or not flat.

The support is preferably nonporous and smooth.

As a variant, the support is nanostructured to control the wettability.

According to one embodiment, the support consists of an opaque or transparent material having an upper surface with reflective properties. This may facilitate the formation of interference observable in reflected light.

The term "reflective" means herein total or partial optical reflection, of specular type. The reflection preferably relates to the wavelength range of the visible region.

The support advantageously consists of a silicon wafer.

Preferably, the micro-deposits are located on a hydrophobic support. The hydrophobicity of the support reduces the risk of coalescence of droplets during printing, and allows the production of a deposit having a thickness that is greater than on a hydrophilic surface.

The support may be made hydrophobic via any technique known to those skilled in the art.

A treatment with perfluoro compounds, such as compounds bearing perfluorocarbon groups, may be performed. Mention may be made, for example, of treatment with the gas $C_4F_8$.

As a variant, treatment with perfluorodecyltrichlorosilane (FDTS) is performed.

In another variant, a wet-route treatment is performed, for example by immersing the support for a time of 2 to 18 hours in a solution prepared according to the specificities below, followed by drying:

| | |
|---|---|
| Hexane | 14 mL |
| Dichloromethane | 6 mL |
| Acetic acid | 0.1 mL |
| 3-Methacryloxypropyltrimethoxysilane | 0.1 mL |

The support may have a hydrophobic coating 100 nm thick or less, on which the micro-deposits are produced.

The compound for which interaction with the polymer(s) and/or the mixture(s) of polymers, preferably with the polymer or the mixture of polymers, is studied is typically an enzyme or a set of enzymes, the interaction between the compound and the polymer(s), preferably between the compound and the polymer, preferably being an enzymatic degradation, notably enzymatic hydrolysis of the polymer(s), preferably of the polymer, by the compound.

The polymer(s) may be degradable with an enzyme or a set of enzymes.

As enzymes that are particularly suitable, mention may be made of enzymes of hydrolase type, but not exclusively.

During the step of exposing the micro-deposits to the compound, said compound is preferably in solution, notably in aqueous solution.

When it is an enzyme, said enzyme is typically in aqueous solution, under conditions that are suitable for enzymatic hydrolysis.

The term "enzymatic hydrolysis" denotes a mechanism performed by an enzyme of hydrolase type, catalyzing a biochemical hydrolysis reaction.

Among the enzymes of hydrolase type, mention may be made in particular of enzymes with hydrolytic activity toward biopolymers.

Among these enzymes that are capable of hydrolyzing biopolymers, mention may be made in particular of glycoside hydrolases, which include glycosidases (or acting via an "exo" mechanism) when they act with a mechanism of attack of the reducing or non-reducing ends of the polymer, and also enzymes (acting with an "endo" mechanism) which are capable of hydrolyzing the internal bonds of a polymer.

The term "glycoside hydrolases" includes, inter alia, xylanases, cellulases, chitinases, pectinases, mannases and Cellulyve (registered trademark).

Among the biopolymer-hydrolyzing enzymes, examples that may be mentioned include proteases, esterases, nucleases and ligninases.

The polymer or the mixture of polymers studied in the process of the invention is preferably present in the micro-deposits in a content of between 99.5% to 95% by weight relative to the total weight of the layer of said deposits in which it is present.

Preferably, the polymer studied in the process of the invention is preferably present in the micro-deposits in a content of between 99.5% to 95% by weight relative to the total weight of said deposits.

The polymer(s), preferably the polymer, may be chosen from biopolymers.

Such biopolymers may be in an isolated form (i.e. distinct polymer chains), in aggregated form (i.e. entangled polymer chains) or in crystalline form (i.e. polymer chains organized in an ordered repeating pattern).

The polymer(s) may be biopolymers, notably chosen from the group consisting of oligosaccharides and polysaccharides such as cellulose, xylan, pectin, chitosan, chitin, xyloglucan, beta-glucan, and arabinoxylan; peptides and proteins such as bovine or human serum albumin and glutenin; nucleic acids such as deoxyribonucleic acids and ribonucleic acids; cutin, suberin and lignin.

Preferably, the polymer is a biopolymer, notably chosen from the group consisting of oligosaccharides and polysaccharides such as cellulose, xylan, pectin, chitosan, chitin, xyloglucan and arabinoxylan; peptides and proteins such as bovine or human serum albumin and glutenin; nucleic acids such as deoxyribonucleic acids and ribonucleic acids; cutin, suberin and lignin.

The mixture of polymers may include a biopolymer, notably chosen from the group consisting of oligosaccharides and polysaccharides such as cellulose, xylan, pectin, chitosan, chitin, xyloglucan, beta-glucan and arabinoxylan; peptides and proteins such as bovine or human serum albumin and glutenin; nucleic acids such as deoxyribonucleic acids and ribonucleic acids; cutin, suberin and lignin.

The polymer(s), preferably the polymer, is advantageously immobilized on the support.

This immobilization may be generated by bonds (i) of covalent or "chemical" type (crosslinking) and/or (ii) of noncovalent or "physical" type (electrostatic, hydrogen, Van der Waals force).

In case (i) above, the micro-deposits contain, for example, a resin present in a content of between 0.5% to 5% by weight relative to the total weight of the micro-deposits, this resin preferably being a thermosetting resin, for example melamine formaldehyde.

For the choice and implementation of such a resin, reference may be made to the following documents: Ducéré et al. Sensors and Actuators B: Chemical 2005, 106(1), 331-334, Wu et al. Separation and Purification Technology 2009, 68(1), 97-104, and Schuler et al. Biomacromolecules 2001, 2(3), 921-926.

For example, crosslinking with melamine-urea-formaldehyde or melamine-formaldehyde resins (also referred to as "MUF" or "MF") has the following advantages:
- the crosslinking reaction may take place with numerous chemical functions (alcohol, amine, phenol), thus making it possible to crosslink a large number of classes of biopolymers;
- water-soluble resin formulations exist;
- crosslinking is simple: the monomer is stable at room temperature and it reacts when the film is brought to 90° C. under a dry atmosphere for one hour, this treatment being compatible with the majority of biopolymers.

In the embodiment in which the compound is an enzyme, the process according to the invention makes it possible to analyze the enzymatic degradation activity of natural polymers, or mixtures of polymers, typically of biopolymers such as polysaccharides or lignins, or of synthetic polymers, in a context in which the number of enzymes to be tested is large and the cost of the test is reduced. The invention makes it possible to perform the test in the field, with the naked eye, without any special equipment.

The invention makes it possible 1) to identify the compound or the mixture of compounds which most efficiently degrades a polymer or a mixture of polymers and 2) to classify a set of compounds or a mixture of compounds relative to their kinetics of degradation of a polymer or of a mixture of polymers.

The invention makes it possible, if so desired, by means of the detection by interferometry, to go back up to the loss of volume of the solid deposits induced by the degradation due to the enzymatic reaction. It makes it possible to do so either semi-quantitatively in the context of a laboratory using a simple microscope, or qualitatively in the field with the naked eye.

Advantages of the process according to preferred implementation variants of the invention are the following:
- possibility of studying a single enzyme or a cocktail of enzymes,
- capacity for depositing a set of polymers or mixtures of polymers of different compositions, on the same support, in the same pattern or from one macro-pattern to another,
- detection of the enzyme-polymer interaction without using a marker,
- sensitivity level equivalent to or better than that of conventional biochemical techniques using a fluorogenic or chromogenic substrate for an equivalent incubation time,
- possibility of modulating the detection dynamics as a function of the type of sample tested (physicochemical properties of the deposit of carbohydrates),
- integration of a twofold level of analysis: a) macroscopic making it possible to visualize whether or not there is hydrolysis, b) microscopic making it possible to extract semi-quantitative data regarding the activities of the enzymes.

In the context of the functional diagnosis of microbial ecosystems or of isolated strains, the capacity for manufacturing a low-cost, disposable enzymatic test which rapidly gives an answer is of undeniable interest. Specifically, whether for environmental applications (degradation performance of a polluting polymer), in human health (degradation of intestinal mucus by opportunistic commensals, or pathogens), or in animal nutrition (degradation performance of dietary fibers by the digestive ecosystem or by exogenous enzyme cocktails added to the feed to increase the energy efficiency), semi-quantitative assay of the degradation activities of polymers is a necessary prerequisite for the characterization and engineering of ecosystems to optimize the services rendered (at the environmental level, or for the health of the host when it is a human or animal ecosystem).

The current use of enzymes in certain industrial sectors (textile, human and animal nutrition) requires during production that tests be performed to check the conformity of the final product, and the process according to the invention thus turns out to apply also to quality control.

Device

The invention also relates to a device, notably for performing the process as defined above, including:
- a support,
- a plurality of individualized micro-deposits borne by the support, the thickness of the micro-deposits being chosen to allow the formation of an interference pattern when illuminated with a suitable light, preferably monochromatic light, each micro-deposit including at least one polymer.

The invention also relates to a device that is particularly suitable for performing the process according to the invention as defined above, including:
- a support,
- a plurality of individualized micro-deposits borne by the support, each allowing the formation of an interference pattern when illuminated with a suitable light, notably monochromatic light, each micro-deposit including at least one polymer.

The surface of the micro-deposit(s) can be illuminated with a suitable light, preferably monochromatic light.

The characteristics of the invention described above in reference to the process are also valid for the devices, and vice-versa.

Assembly

A subject of the invention is also an assembly including a device according to the invention and a compound interacting with said polymer to lead to a variation in the dimensions and/or refractive index of the micro-deposits. This variation may result from an enzymatic degradation reaction between the polymer and the compound.

The invention also relates to an assembly including a device according to the invention and a compound interacting with the polymer(s) to lead to a variation in the dimensions and/or refractive index of the micro-deposits. This variation may result from an enzymatic degradation reaction between the polymer(s) and the compound.

Process for Manufacturing the Device

The invention also relates to a process for manufacturing a device according to the invention, including the deposition by inkjet printing onto the support of dots of an ink containing the polymer(s) to form the micro-deposits.

The invention also relates to a process for manufacturing a device according to the invention, including the deposition by printing onto the support of dots of an ink containing said polymer to form the micro-deposits.

Preferably, the printing technique is of the inkjet type.

According to a preferred embodiment, this manufacturing process comprises a step of crosslinking the ink so as to convert the ink dots into individualized solid micro-deposits.

The process may include modification of the wettability of the support prior to printing the micro-deposits, in order to adjust the thickness of the micro-deposits, to obtain a convex shape for same and to modify the homogeneity of the thickness.

According to a variant of the process for manufacturing the device, the deposition by printing on the support is performed in several successive spatially superposed passes, so as to obtain multilayer micro-deposits, each pass making it possible to deposit a layer of ink.

Preferably, the number of passes is equal to two. This makes it possible to form on the support micro-deposits including two superposed layers, notably with a core-shell architecture. In this case, the micro-deposit has a first layer corresponding to the core, and a second layer corresponding to the shell.

The first layer may be positioned on the support, preferably in contact therewith, and may be lens-shaped.

The second layer may at least partially and preferably totally cover the first layer and may have a shape complementary to that of the first layer.

In a first step, the first layer is deposited on the support, preferably in contact therewith, during a first pass.

In a second step, the second layer is deposited during a second pass so that said second layer at least partially and preferably totally covers the first layer.

The deposition of the second layer is preferably performed when the first layer is crosslinked.

It is thus possible, by using a different ink in the first and second layers, to obtain micro-deposits consisting of layers of different nature, for example each including a different polymer, or else different ratios of mixed polymers.

The thickness of the multilayer micro-deposits is preferably between 100 nm and 1500 nm, better still between 100 and 1000 nm, the thickness of each multilayer micro-deposit advantageously passing through a single maximum.

The largest dimension of the multilayer micro-deposits is preferably between 10 µm and 100 µm.

The thickness of the first layer of the multilayer micro-deposit is preferably between 30 nm and 1300 nm, better still between 70 nm and 800 nm.

The largest dimension of the first layer of the multilayer micro-deposit is preferably between 5 µm and 95 µm.

Aqueous Ink

A subject of the invention is also an ink, preferably an aqueous ink, which is particularly suitable for performing the process for manufacturing a device according to the invention, including:
- the polymer(s), preferably the 'polymer',
- a binder, preferably a resin, notably melamine-formaldehyde, and
- an organic cosolvent chosen to allow the formation of a micro-deposit of convex shape during the drying of the ink, preferably dimethyl sulfoxide (DMSO).

Preferably, the polymer content in the ink is from 1 mg/mL to 10 mg/mL relative to the volume of the ink.

In the case of a mixture of polymers, the proportions of each of the polymers in the mixture are chosen as a function of the intended application.

Preferably, the resin content in the ink is between 0.01 mg/mL and 0.1 mg/mL relative to the volume of the ink.

The polymer(s)/resin ratio may be between 100 and 300. The polymer(s)/resin ratio is preferably equal to 200.

The viscosity of the ink at 20° C. is preferably between 5 mPa·s and 20 mPa·s, preferentially equal to 15 mPa·s±3 mPa·s, for example equal to 17 mPa·s.

The surface tension is, for example, 62 mN·m$^{-1}$, preferably being less than 70 mN·m$^{-1}$.

The ink is preferably packaged in an inkjet printer cartridge.

The ink may comprise at least one film-forming agent, said agent allowing the easy formation of the micro-deposit.

Said film-forming agent is chosen, for example, from: polyallylamine, polyacrylamide, polyvinylpyrrolidone, and copolymers thereof.

Preferentially, said film-forming agent is poly(allylamine) hydrochloride PAH.

The content of film-forming agent in the ink is preferentially between 0% and 10% by volume.

The ink may comprise at least one catalytic agent, this agent making it possible to facilitate the crosslinking of the micro-deposit.

Said catalytic agent may be chosen as a function of its influence on the annealing temperature required for the formation of the micro-deposit.

Said catalytic agent is chosen, for example, from acids.

Preferentially, said catalytic agent is hydrochloric acid.

The content of catalytic agent in the ink is preferentially between 0% and 10% by volume.

The ink is preferably free of pigments or dyes.

The presence of the organic cosolvent is useful for avoiding the "coffee stain" effect during the drying of the ink, leading to the formation of a deposit of less uniform thickness on the support. Solvents other than DMSO are possible, for example ethylene glycol or N,N-dimethylformamide (DMF), inter alia.

The ink may be packaged in an inkjet printer cartridge.

FIG. 1 shows an example of a device 1 according to the invention, including a support 10 which is, for example, a silicon wafer that has been made hydrophobic, on which are formed macro-patterns 20 in the form, for example, of squares placed with respective spacings $D_X$ and $D_Y$ in directions X and Y, corresponding to those of the wells of a conventional well plate.

The side D of a macro-pattern 20 measures, for example, between 3 and 5 millimeters and the values $D_X$ and $D_Y$ are, for example, between 3 and 5 mm also.

Each macro-pattern 20 which has a millimetric size is formed from a raster of micro-deposits 21, these micro-deposits being close enough to give with the naked eye a uniform appearance to each macro-pattern 20. For example, the separation $d_x$ in the X direction and the separation $d_y$ in the Y direction are between 50 and 340 micrometers, better between 50 and 100 micrometers, the diameter d of a micro-deposit 21 being, for example, between 10 and 100 micrometers and its height h (which corresponds to the thickness) between 100 nm and 1500 nm.

In the example under consideration, the micro-deposits 21 are deposited by inkjet printing with a uniform spacing. The ink has a formulation that is suited to the formation of a convex outer surface.

The micro-deposits 21 allow, due to the difference in refractive index with the support 10, and also to the reflective nature of the support 10, the formation of interference fringes such as Newton rings, as illustrated in FIG. 4. These interference patterns may be observed by microscope by illuminating the device 1 with white or monochromatic light.

The device 1 may be used by depositing on each macro-pattern 20 a drop G of a test compound, as illustrated in FIG. 5. Depending on whether or not a degradation reaction of the polymer by hydrolysis takes place, the change in appearance of the macro-pattern 20 may be observed with the naked eye.

FIG. 5 shows at the top in the center the situation in which there is no reaction between the enzyme and the polymer, the hydrolysis reaction being zero, and at the bottom on the left the case where the hydrolysis is partial, or even total at the bottom on the right, which allows detection of the enzyme. This qualitative approach may be completed by a quantitative approach by observation of the interference patterns.

Specifically, in the case of a partial hydrolysis, the modification of the interference patterns which may be detected by interferometry makes it possible to calculate the volume of the micro-deposit degraded by the hydrolysis reaction. In the case of a total hydrolysis, the micro-deposits are completely destroyed.

EXAMPLES

Example 1

Manufacture of a Detection Device

A device according to the invention for testing various enzymes or mixtures of enzymes with respect to a polymer was prepared according to the manufacturing process described above.

First Step: Preparation of the Ink

A first aqueous ink formulation suitable for inkjet printing was prepared according to the specificities below, in which the polymer used is arabinoxylan:

| Mono-polymer ink (formulation 1) | Variant 1 | Variant 2 |
| --- | --- | --- |
| Arabinoxylan Megazyme-wheat Arabinoxylan-Medium viscosity 22 cSt-323 Kd molecular weight | 5 mg/mL | 3 mg/mL |
| Melamine formaldehyde (resin) ® Resimene AQ-7551 sold by INEOS Melamines | 0.025 mg/mL | 0.015 mg/mL |
| DMSO CAS 67-68-5 | 10% vol | 10% vol |
| Poly(allylamine) hydrochloride PAH sold by Polyscience, Mw-120000-200000 g/mol | 0.004 mg/mL | 0.004 mg/mL |
| Hydrochloric acid HCl | 0.01 mM | 0.01 mM |

The viscosity of the ink obtained according to variant 1 of formulation 1 is 17 mPa·s (at the ejection temperature of 20-30° C.) and the surface tension is of the order of 60 N/m (at the ejection temperature).

In the case of variant 1 of formulation 1, the polymer/resin ratio is 200 (5/0.025).

In the case of variant 2 of formulation 1, the polymer/resin ratio is also 200 (3/0.015).

Below, a second formulation in which the polymer used is beta-glucan, and a third formulation in which the polymers used are arabinoxylan and beta-glucan (ink with a 50%/50% mixture of polymers), are proposed as illustration of the invention:

| Mono-polymer ink (formulation 2) | Variant 1 | Variant 2 |
| --- | --- | --- |
| Beta-glucan | 7 mg/mL | 3 mg/mL |
| Melamine formaldehyde (resin) ® Resimene AQ-7551 sold by INEOS Melamines | 0.025 mg/mL | 0.015 mg/mL |
| DMSO CAS 67-68-5 | 10% vol | 10% vol |
| Poly(allylamine) hydrochloride PAH sold by Polyscience, Mw-120000-200000 g/mol | 0.004 mg/mL | 0.004 mg/mL |
| Hydrochloric acid HCl | 0.01 mM | 0.01 mM |

In the case of variant 1 of formulation 2, the polymer/resin ratio is 280 (7/0.025).

In the case of variant 2 of formulation 2, the polymer/resin ratio is also 200 (3/0.015).

| Multi-polymer ink (formulation 3) | Variant 1 | Variant 2 |
| --- | --- | --- |
| Arabinoxylan Megazyme-wheat Arabinoxylan-Medium viscosity 22 cSt-323 Kd molecular weight | 2.5 mg/mL | 1.5 mg/mL |
| Beta-glucan | 2.5 mg/mL | 1.5 mg/mL |
| Melamine formaldehyde (resin) ® Resimene AQ-7551 sold by INEOS Melamines | 0.025 mg/mL | 0.015 mg/mL |
| DMSO CAS 67-68-5 | 10% vol | 10% vol |

-continued

| Multi-polymer ink (formulation 3) | Variant 1 | Variant 2 |
|---|---|---|
| Poly(allylamine) hydrochloride PAH sold by Polyscience, Mw-120000-200000 g/mol | 0.004 mg/mL | 0.004 mg/mL |
| Hydrochloric acid HCl | 0.01 mM | 0.01 mM |

In the case of variant 1 of formulation 3, the polymer/resin ratio is 200 ((2.5+2.5)/0.025).

In the case of variant 2 of formulation 3, the polymer/resin ratio is also 200 ((1.5+1.5)/0.015).

Second Step: Modification of the Support

A silicon wafer is used as support.

In order to obtain convex-shaped deposits and to avoid spreading of the droplets, the upper face of the wafer is treated with $C_4F_8$ to be made hydrophobic.

Third Step: Inkjet Printing

The ink prepared beforehand according to variant 1 of formulation 1 was loaded into an inkjet printer and ink dots are printed on the support, as raster dots.

The printing parameters are:
ink ejection temperature: room temperature (20° C.-30° C.),
ejection volume of the droplets (per micro-deposit): 65 pL 5 pL,
micro-deposit thickness: less than 1 μm,
ejection speed of the droplets: 5 to 6 m/s, and
macro-pattern: square matrix with a side length of 4 cm with spacing between two micro-deposits in the macro-pattern equal to 70 μm Fourth Step: Thermal Crosslinking of the Ink Deposits The support onto which the liquid ink dots were deposited is placed at 130° C. for 10 to 180 minutes until crosslinking of the resin and solidification of the micro-deposits are complete.

Use of the Detection Device

The device thus manufactured was used to study the kinetics of degradation of the polymer present in the deposits, namely arabinoxylan (AX), by enzymatic solutions of commercial xylanase each having a different level of activity.

First, the device was immersed in water at 37° C. for 2 hours, and then immersed in an aqueous solution of BSA (bovine serum albumin) at 0.25 g/L at 37° C. for 1 hour, in order to passivate the surface between the polymer deposits, which improves the measurement sensitivity.

In this example, the protein used as passivation agent is BSA. However, the invention is not limited to this particular case.

For example, proteins other than BSA may be used as passivation agent, such as ovalbumin or lysozyme.

The concentration range of passivation agent in the bath in which the device is immersed is preferentially between 0.1 g/L and 1 g/L.

Xylanase solutions of different concentrations were prepared, having enzymatic activities ranging from 0.23 nkat/mL (dilution to 102 400—test No. 2) up to 14.8 nkat/mL (dilution to 1600—test No. 8).

A drop of 7 μL of each of these solutions is deposited on a corresponding macro-pattern. As control, a drop of acetate buffer is deposited on another pattern.

After incubation for 60 minutes at room temperature, rinsing with water and drying of the device, different results for each concentration were observed with the naked eye (cf. table below).

| Test No. | Enzymatic activity (nkat/mL) | Dilution factor (relative to the commercial xylanase solution) | Result observed (with the naked eye) |
|---|---|---|---|
| 1 (control) | 0 | — | — |
| 2 | 0.23 | 102 400 | — |
| 3 | 0.46 | 51 200 | — |
| 4 | 0.92 | 25 600 | + |
| 5 | 1.85 | 12 800 | ++ |
| 6 | 3.7 | 6400 | +++ |
| 7 | 7.4 | 3200 | +++ |
| 8 | 14.8 | 1600 | +++ |

This test made it possible to estimate a sensitivity threshold approximately located at 0.92 nkat/mL (i.e. $6.4 \times 10^{-3}$ nkat).

Example 2

FIG. 7 represents a photograph of an assembly of macro-patterns according to the invention which has been placed in contact with different concentrations of xylanase (14.8-0.23 nkat/mL) for 60 minutes after hydration by immersion in water for 2 hours at 37° C. followed by passivation for 1 hour in a solution of BSA at 0.25 g/L at 37° C.

This photograph reveals the detection limit with the naked eye for a dilution factor of 25 600.

Example 3

FIG. 8 represents an image matrix of micro-deposits, chosen randomly from the macro-patterns exposed to different concentrations of enzyme for quantifying the action of the enzyme on AX. Xylanase is suspended at concentrations of between 0.45 and 14.6 nkat/mL for different exposure times.

Representation of the degradation kinetics is given in FIG. 8. It shows that the sensitivity threshold is between 1.83 and 0.91 nkat/mL for a 30-minute incubation. In the case of an incubation for twice as long (60 minutes), this threshold is between 0.45 and 0.91 nkat/mL.

The invention claimed is:

1. A process for detecting sensitivity of one or more polymers and/or of one or more mixtures of polymers to a compound, including the steps consisting in:
   exposing a plurality of individualized micro-deposits including the polymer(s) and/or the mixture(s) of polymers to the compound, and
   detecting by interferometry a variation in the appearance of a set of micro-deposits exposed to the compound and/or variation in the dimensions and/or refractive index of at least one of the micro-deposits exposed to the compound, linked to an interaction between the polymer(s) and/or the mixture(s) of polymers and the compound.

2. The process as claimed in claim 1, the thickness of the micro-deposits being chosen to allow the formation of an interference pattern when illuminated with a suitable light.

3. The process as claimed in claim 1, wherein a largest dimension of the micro-deposits being between 10 μm and 100 μm.

4. The process as claimed in claim 1, the thickness of each micro-deposit passing through only one maximum.

5. The process as claimed in claim 1, each micro-deposit having a convex outer surface.

6. The process as claimed in claim 1, detection by interferometry of a variation in the volume of at least one micro-deposit being performed, this variation in volume taking place under the effect of an interaction between the polymer(s) and/or the mixture(s) of polymers and the compound.

7. The process as claimed in claim 6, detection being performed after magnification of the interference pattern.

8. The process as claimed in claim 1, including the reconstruction of the volume of the micro-deposit from the localization of the interference fringes.

9. The process as claimed in claim 1, the micro-deposits being arranged in the form of raster dots.

10. The process as claimed in claim 1, the micro-deposits being arranged in macro-patterns.

11. The process as claimed in claim 1, the micro-deposits being located on a reflective support.

12. The process as claimed in claim 1, the micro-deposits being located on a hydrophobic support.

13. The process as claimed in claim 1, the compound being an enzyme.

14. The process as claimed in claim 1, the polymer(s) being biopolymers.

15. The process as claimed in claim 1, the micro-deposits including a resin.

16. A device for performing the process according to claim 1, including:
   a support,
   a plurality of individualized micro-deposits borne by the support, the thickness of the micro-deposits being chosen to allow the formation of an interference pattern when illuminated with a suitable light, each micro-deposit including at least one polymer.

17. The device as claimed in claim 16, the thickness of the micro-deposits being between 100 nm and 1500 nm.

18. The device as claimed in claim 16, the largest dimension of the micro-deposits being between 10 μm and 100 μm.

19. The device as claimed in claim 16, the thickness of each micro-deposit passing through only one maximum.

20. The device as claimed in claim 16, each micro-deposit having a convex outer surface.

21. The device as claimed in claim 16, the micro-deposits being arranged in the form of raster dots.

22. The device as claimed in claim 16, the micro-deposits being arranged in macro-patterns.

23. The device as claimed in claim 16, the support being reflective.

24. The device as claimed in claim 16, the support being hydrophobic.

25. The device as claimed in claim 16, the polymer(s) being degradable with an enzyme or a set of enzymes.

26. The device as claimed in claim 16, the polymer(s) being biopolymers.

27. The device as claimed in claim 16, the micro-deposits including a resin.

28. An assembly including a device as defined in claim 16 and a compound interacting with said polymer to lead to a variation in the dimensions and/or refractive index of the micro-deposits.

29. A process for manufacturing a device as defined in claim 16, including the deposition by inkjet printing onto the support of dots of an ink containing the polymer(s) to form the micro-deposits.

30. An inkjet printer cartridge inside which is packaged an ink for performing the process as claimed in claim 29, the ink including:
   polymers,
   a binder, and
   an organic cosolvent chosen to allow the formation of a convex-shaped micro-deposit during drying of the ink.

* * * * *